UNITED STATES PATENT OFFICE.

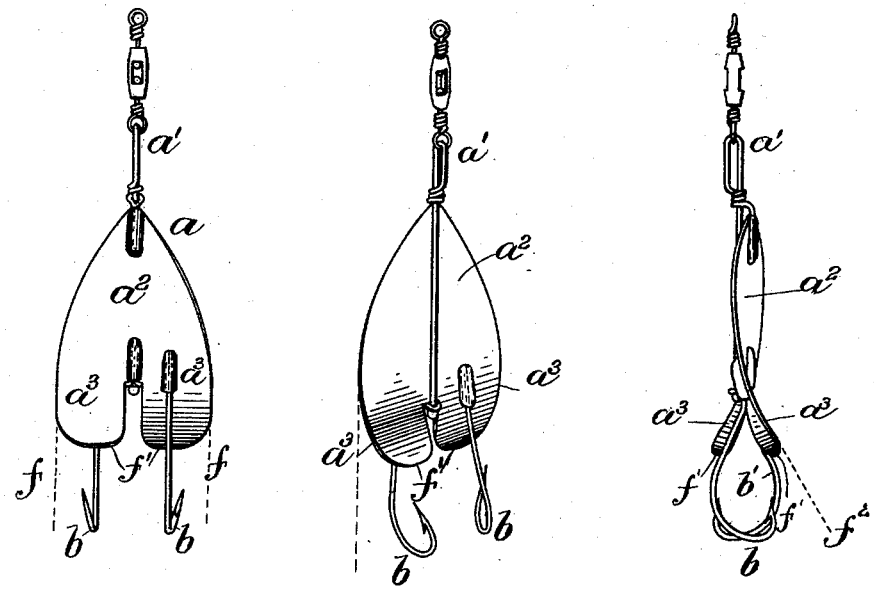

HENRY J. THAYER, OF BOSTON, MASSACHUSETTS.

TROLLING-SPOON.

SPECIFICATION forming part of Letters Patent No. 524,494, dated August 14, 1894.

Application filed June 11, 1894. Serial No. 514,132. (No model.)

*To all whom it may concern:*

Be it known that I, HENRY J. THAYER, of Boston, in the county of Suffolk and State of Massachusetts, have invented certain new and useful Improvements in Trolling-Spoons, of which the following is a specification.

This invention relates to an improvement in trolling spoons and has for its object to so construct and arrange the spoon and the hooks in relation to each other as to prevent the hooks from catching in the weeds.

My invention consists in certain novel features of construction and arrangement of parts which will be fully hereinafter described, and particularly pointed out in the claims.

Reference is to be had to the accompanying drawings and the characters marked thereon, which form a part of this specification, like characters designating like parts or features, as the case may be, wherever they occur.

In the drawings—Figure 1 is a front view of my improved trolling spoon. Fig. 2 is a perspective view thereof. Fig. 3 is a side view thereof.

$a$ represents my new improved form of trolling spoon consisting of the swivel, $a'$, and the spinner, $a^2$, connected thereto in any approved way. The spinner, $a^2$, is constructed with two or more blades, $a^3$, curved in opposite directions to give the spinner a rotary movement when drawn through the water. Upon these blades I secure the hooks with their points within the outside line of revolution, $f$, of the spinner, and away from the direction in which the spinner rotates. The points of the hooks should be a little back of the plane of edge, $f'$, of the curved blades, $a^3$.

The kind of hook or spinner is immaterial so long as the point of the hook lies within the outside line of revolution, $f$, of the spinner, and away from the direction in which the spoon rotates, so that the back of the hook and not the point will strike the weeds, &c., as the spoon is drawn through the water, as shown in Figs. 1 and 2. In practice, however, I have found it better to use bent hooks and secure them upon the blades with their points outward, (see Figs. 1, 2 and 3,) since by this arrangement the fish is more certain to be hooked.

I do not desire to limit myself to any particular form of hook or spinner, my invention including any form of either, so long as the hook is mounted upon the spinner as specified above.

From the foregoing it will be seen that I have devised an exceedingly simple, inexpensive and efficient trolling spoon, one in which the hook is at all times guarded from the weeds, and which can be used among lily pads, &c., as well as in open water, the point of the hook being at all times protected by being inside the line, $f$, away from the direction of revolution of the spinner and a little back of the plane of the edge, $f'$. In this position it is practically impossible for the weeds to catch upon the point of the hook.

I have found in actual practice that even in thick lily pads the hooks of my improved trolling spoon do not become clogged for the reasons stated above, and for the additional reason that the spinner in its passage through the water thrusts the weeds, &c., aside, and it takes an appreciable length of time for them to return to their original positions during which time the hooks have passed beyond them. The hooks being mounted with their backs toward the direction in which the spinner rotates, if weeds, &c., should return to their original position in time to strike the hooks, they strike the back of the hook and are brushed aside or glance off without touching the point.

Having thus explained the nature of my invention and described a way of constructing and using the same, though without attempting to set forth all of the forms in which it may be made or all of the modes of its use, what I claim, and desire to secure by Letters Patent, is—

1. A trolling spoon comprising in its construction a spinner and hooks mounted thereon having their points within the outside line of revolution of the spinner, substantially as and for the purpose described.

2. A trolling spoon comprising in its construction a spinner, hooks mounted thereon with their backs toward the direction in which the spinner rotates in its passage through the water, substantially as and for the purpose described.

3. A trolling spoon comprising in its construction a spinner, hooks mounted thereon with their points within the outside line of revolution of the spinner and away from the direction in which the spinner rotates in its passage through the water, substantially as and for the purpose described.

4. A trolling spoon comprising in its construction a spinner, a hook mounted thereon with its point within the outside line of revolution of the spinner and back of the plane of the lower edge of the spinner, the point of the hook also being away from the direction in which the spinner rotates in its passage through the water, substantially as and for the purpose described.

In testimony whereof I have signed my name to this specification, in the presence of two subscribing witnesses, this 8th day of June, A. D. 1894.

HENRY J. THAYER.

Witnesses:
EUGENE GUELPA,
FRANK G. WHITE.